United States Patent [19]
Yoshida

[11] Patent Number: 5,204,794
[45] Date of Patent: Apr. 20, 1993

[54] MAGNETIC DISK DRIVE COMPRISING DISK CARTRIDGE AND DRIVING DEVICE, WHICH DISK CARTRIDGE INCLUDES CONNECTOR FOR CONNECTING THE DISK CARTRIDGE TO THE DRIVING DEVICE AND CONNECTOR COVER FOR COVERING THE CONNECTOR

[75] Inventor: Kobun Yoshida, Sayama, Japan
[73] Assignee: TEAC Corporation, Tokyo, Japan
[21] Appl. No.: 610,809
[22] Filed: Nov. 8, 1990

[30] Foreign Application Priority Data
Nov. 13, 1989 [JP] Japan ............... 1-131817[U]

[51] Int. Cl.$^5$ ............... G11B 23/03; G11B 5/012
[52] U.S. Cl. ............... 360/133; 360/97.01; 360/99.06; 360/137
[58] Field of Search ............ 360/97.01, 98.04, 98.07, 360/99.01, 99.07, 99.08, 104, 106, 133, 137

[56] References Cited

U.S. PATENT DOCUMENTS

| | | | |
|---|---|---|---|
| 3,843,967 | 10/1974 | Mulvany | 360/133 |
| 3,973,273 | 8/1976 | Lissner et al. | 360/133 |
| 4,359,762 | 11/1982 | Stollorz | 360/133 |
| 4,622,607 | 11/1986 | Smith, II | 360/133 |
| 4,688,206 | 8/1987 | Nakagawa et al. | 360/133 |
| 4,745,500 | 5/1988 | Davis | 360/133 |
| 4,754,397 | 6/1988 | Varaiya et al. | 360/97.01 |
| 4,833,554 | 5/1989 | Dalziel et al. | 360/98.04 |
| 4,908,726 | 3/1990 | Kato | 360/133 |
| 4,965,691 | 10/1990 | Iftikar et al. | 360/133 |
| 4,967,297 | 10/1990 | Okita et al. | 360/106 |
| 4,974,103 | 11/1990 | Iftikar et al. | 360/133 |
| 5,041,924 | 8/1991 | Blackborow et al. | 360/99.07 |
| 5,077,722 | 12/1991 | Geist et al. | 360/137 |

FOREIGN PATENT DOCUMENTS

| | | | |
|---|---|---|---|
| 1-162287 | 6/1989 | Japan | 360/104 |
| 8809551 | 12/1988 | PCT Int'l Appl. | 360/98.07 |

OTHER PUBLICATIONS

SyQuest Technologies SQ555 Disk Drive Installation/Operating Guide.

Primary Examiner—Stuart S. Levy
Assistant Examiner—Jefferson Evans
Attorney, Agent, or Firm—Michael N. Meller

[57] ABSTRACT

A magnetic disk drive has a disk cartridge and a driving device. A disk cartridge is an apparatus which has at least a disk and a head in a sealed case, but has no current supply source to drive them and has no controller to control them. A driving device is an apparatus which has the current supply source and/or the controller. The disk cartridge can be easily connected to and disconnected from the driving device. The connection and disconnection are achieved by connectors of the disk cartridge and the driving device. The connector of the disk cartridge and/or the driving device has a movable cover thereon, and because of the cover, the connector is uncovered when the disk cartridge is connected to the driving device, and is covered when the disk cartridge is disconnected from the driving device.

1 Claim, 20 Drawing Sheets

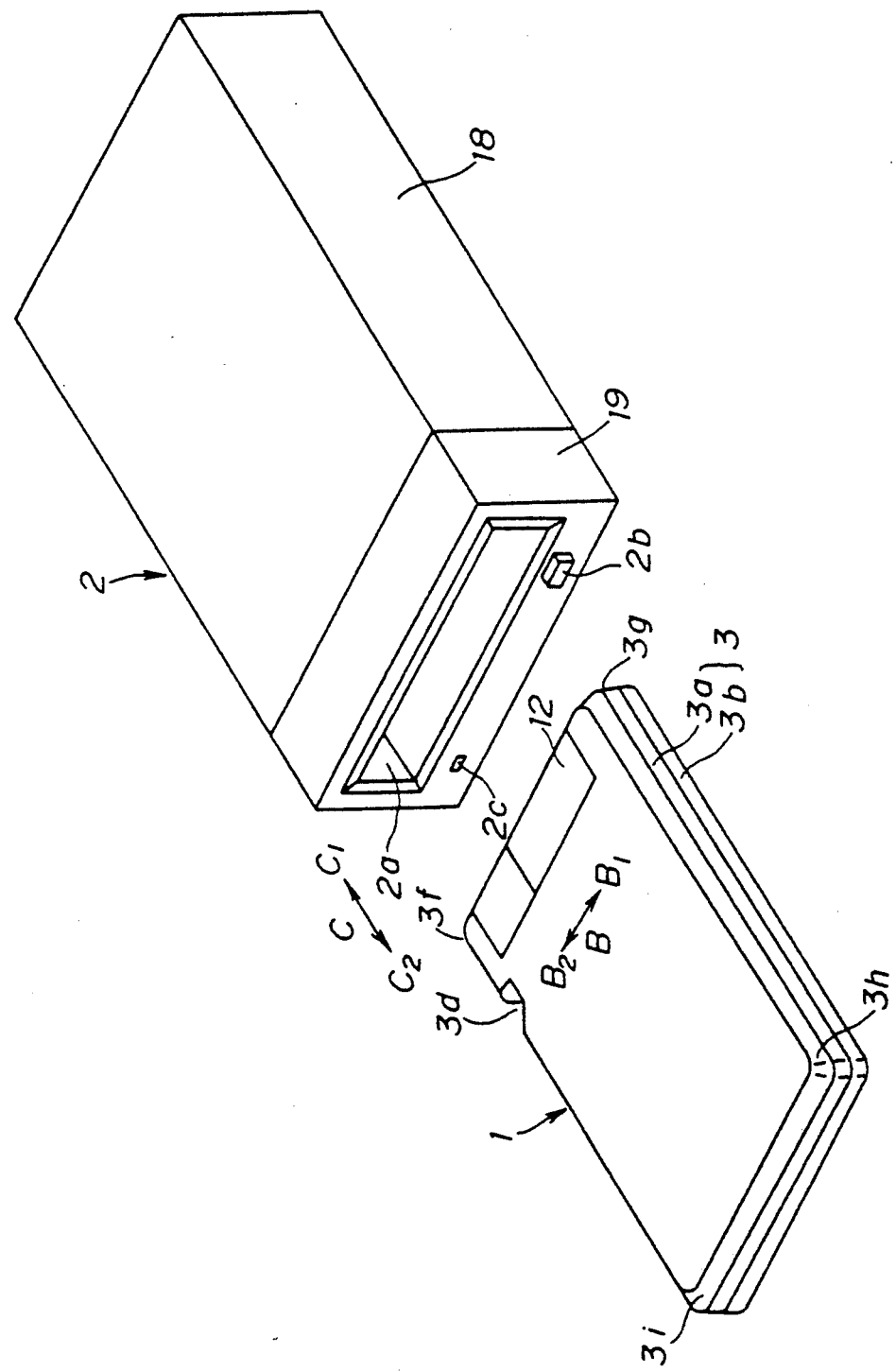

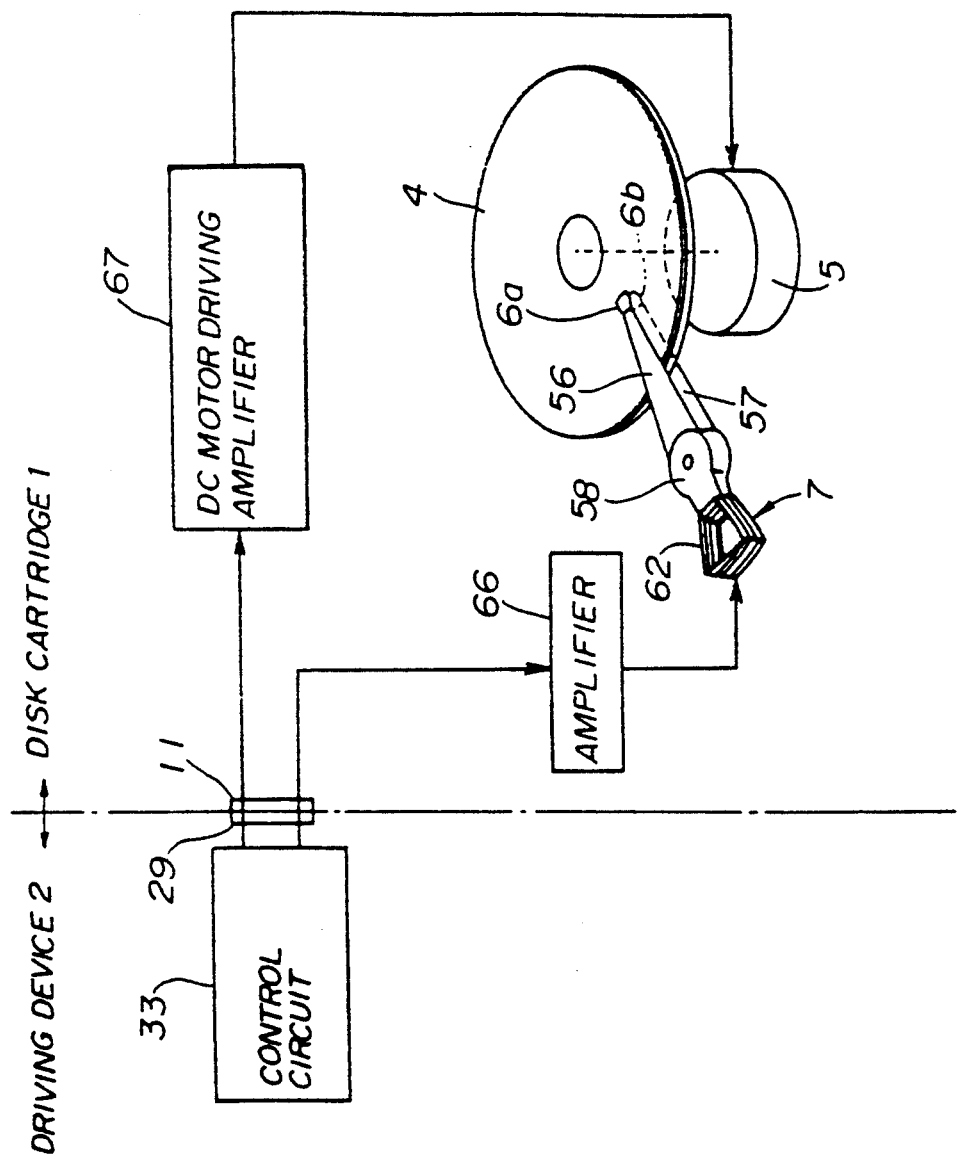

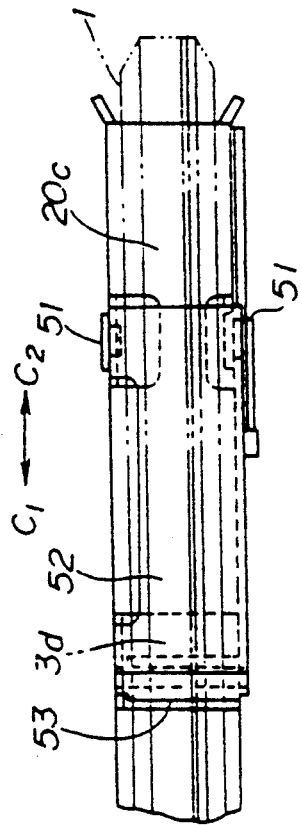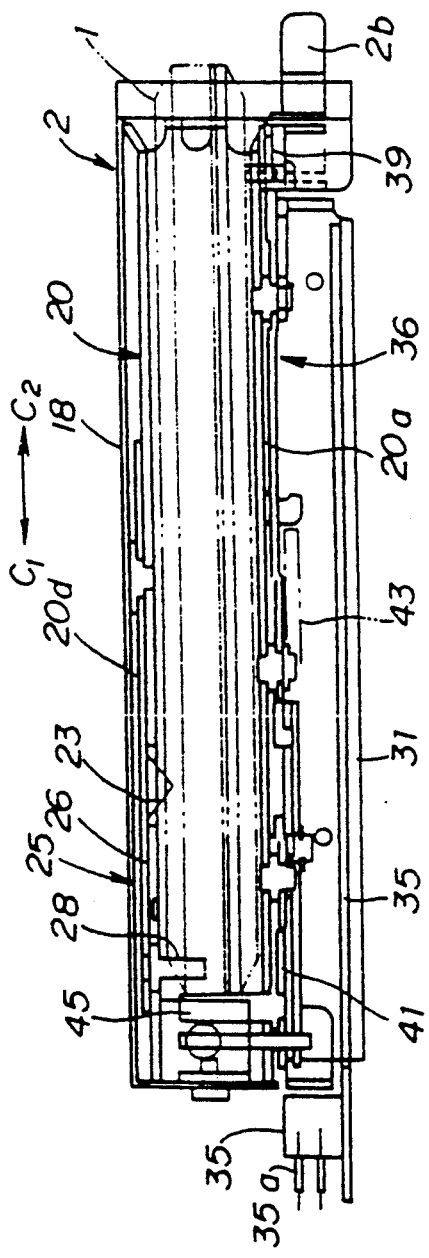

MAGNETIC DISK DRIVE COMPRISING DISK CARTRIDGE AND DRIVING DEVICE, WHICH DISK CARTRIDGE INCLUDES CONNECTOR FOR CONNECTING THE DISK CARTRIDGE TO THE DRIVING DEVICE AND CONNECTOR COVER FOR COVERING THE CONNECTOR

BACKGROUND OF THE INVENTION

The present invention relates generally to magnetic disk drives, and more particularly to a magnetic disk drive which comprises a disk cartridge and a driving device. The term "a disk cartridge", as used herein, means an apparatus which comprises at least a disk and a head in a sealed case, but has no current supply source to drive them and has no controller to control them. The term "a driving device", as used herein, means an apparatus which has the current supply source and/or the controller. The disk cartridge can be easily connected to and disconnected from the driving device. The driving device may be connected to an external computer, such as a host computer, and the disk cartridge can be driven and controlled by the driving device and/or the external computer. Therefore the disk cartridge may be considered as being an easily exchangable hard disk.

Among magnetic disk drives, hard disk drives have been used as memory means for computers. Hard disks have been more improved than so-called floppy disks in TPI (track per inch) and BPI (bit per inch) so that the hard fixed in a sealed-up housing to prevent dust from the outside attaching itself thereon so that it can be recorded with high density.

Consequently, information recorded on the hard disk cannot be used generally except with a computer which includes the hard disk drive. And when the hard disk is overflown, as the disk cannot be easily exchanged, it is troublesome to exchange the hard disk drive itself.

Accordingly, this applicant has developed a disk drive comprising a disk cartridge and the driving device mentioned above. The connection and disconnection between the disk cartridge and the driving device are achieved by connectors. But, since the disk cartridge is portable, if the connector of the disk cartridge is always uncovered, the connector pins thereof could suffer damage. On the other hand, the connector should be uncovered when the disk cartridge is connected to the driving device.

SUMMARY OF THE INVENTION

Accordingly, it is a general object of the present invention to provide a novel and useful magnetic disk drive in which the problems described above are eliminated.

A more specific object of the present invention is to provide a magnetic disk drive comprising a disk cartridge and a driving device where the connectors of the disk cartridge and/or the driving device are being exposed only when the disk cartridge is connected to the driving device.

Another more specific object of the present invention is to provide a magnetic disk drive which comprises a disk cartridge a driving device, and wherein the disk cartridge comprises a magnetic disk, a magnetic head for recording information on the magnetic dish and/or reproducing information therefrom the cartridge has a first connector for receiving electricity to drive the magnetic disk and the magnetic head, and a first cover for covering the first connector when the first cover is at a first position, and for uncovering the first connector when the first cover is at a second position. The first cover is movable between the first position and the second position. The driving device comprises a current supplying connector connected to the first connector. The current supply source supplies the electricity to the disk cartridge via the first connector and the current supplying connector. In addition, the cartridge has first moving means for moving the first cover between the first position and the second position. The first moves means moving the first cover to the second position when the first connector is connected to the current supply connector, and moves the first cover to the first position after the first connector is disconnected from the current supply connector.

Other objects and further features of the present invention will be apparent from the following detailed description when read in conjunction with the accompanying drawings.

BRIEF DESCRIPTION OF THE DRAWINGS

FIG. 6(A) is a system block diagram showing a general circuit arrangement which drives an actuator and a motor;

FIG. 17 is a side view of a mis-eject preventing mechanism;

FIG. 19 is a cross-sectional view of a holder in which the disk cartridge is inserted;

DESCRIPTION OF PREFERRED EMBODIMENTS

A detailed description will now be given of a magnetic disk drive according to a preferred embodiment of the present invention. Referring to FIG. 1(A), the magnetic disk drive comprises a disk cartridge 1 and a driving device 2. The driving device 2 supplies electric power to the disk cartridge 1 to drive it while the disk cartridge 1 is inserted into the driving device 2 from a frontal insert entrance 2a. The disk cartridge 1 can be easily inserted into and ejected from the driving device 2, and it is to be inserted only when it is used like a floppy disk. A plurality of disk cartridges with different memory capacities may be prepared, and one of them may be selected depending upon the kind or amount of information.

The driving device 2 is connected to an external computer (not shown). Therefore it is possible to transfer information easily from the computer to the disk cartridge 1.

Figure 1:
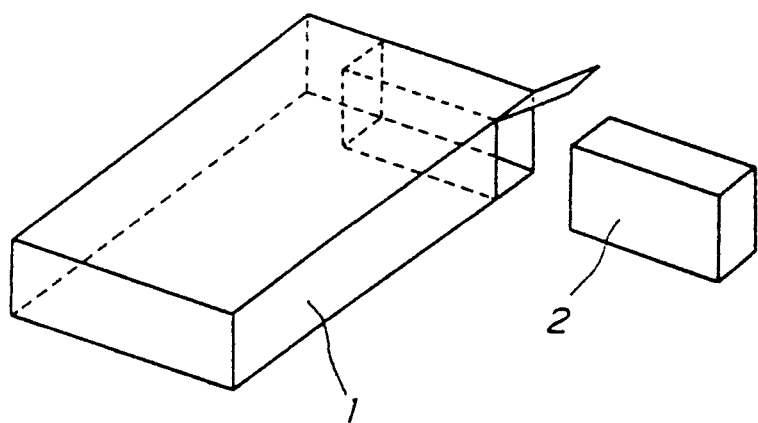
FIG. 1(A) is a perspective view of a magnetic disk drive according to the present invention.
FIG. 1(B) is a view for explaining a varied example of connection between a disk cartridge and a driving device.
Figure 2A:
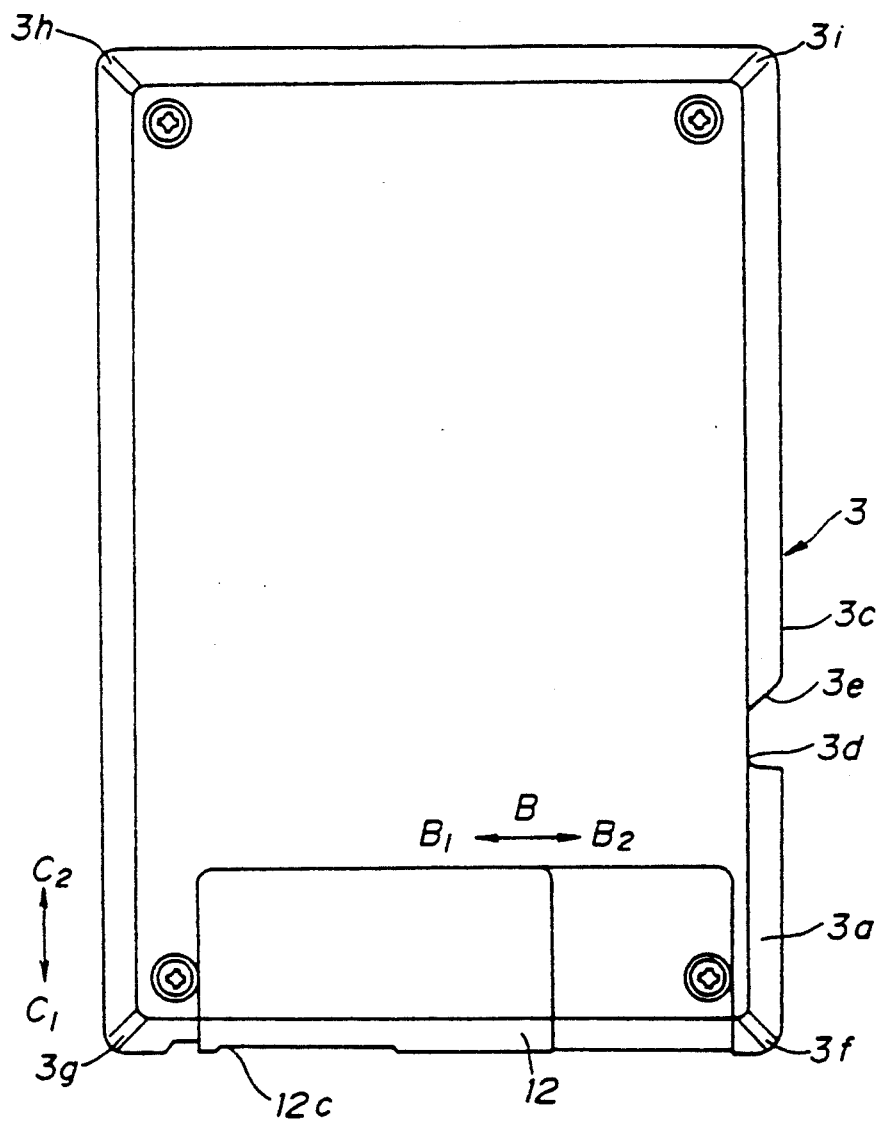
FIG. 2(A) and FIG. 2(B) are respectively a plane view and a front view of a disk cartridge shown in FIG. 1.
Figure 2B:
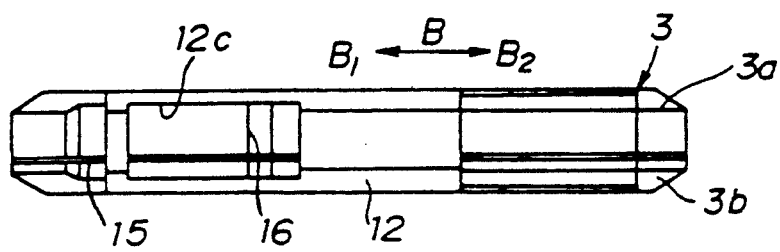
Figure 4A:
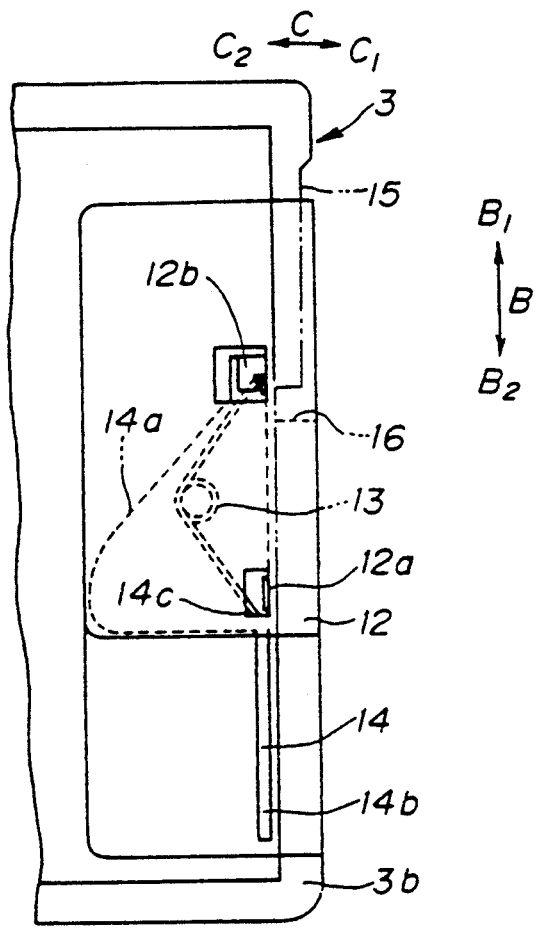
FIG. 4(A), FIG. 4(B) and FIG. 4(C) are respectively a plane view, a cross-sectional view and a perspective view for explaining the operation of the shutter.
Figure 4B:
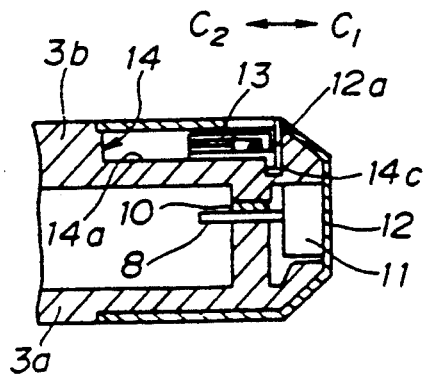

In this embodiment, the disk cartridge 1 has a single hard disk, however, needless to say, the present invention can be applied to a plurality of disks. As shown in FIG. 1 and FIG. 2, the disk cartridge 1 is enclosed in a sealed-up case 3 to prevent dust from attaching itself to the disk. As shown in FIG. 4(B), the case 3 comprises an upper case 3a and a lower case 3b, and located in the junction between them is an elastic member 10 which keeps the case 3 airtight. Electric power is supplied from the driving device 2 to the disk cartridge 1 via a connector 11. The connector 11 is connected with a junction 8b of a flexible printed circuit board 8, and the electric power is supplied to every part of the disk cartridge 1 via the flexible printed circuit board 8.

The disk cartridge 1 has four electrical mechanisms, such as a disk rotating mechanism, a head moving mechanism, a holding mechanism, and a resetting mechanism. On the other hand, the driving device 2 has five mechanical mechanisms which cooperate with the disk cartridge 1, such as a charging mechanism, a mis-insert preventing mechanism, an on-off shutter mechanism, an ejecting mechanism, and a mis-eject preventing mechanism. Now the electrical mechanisms of the disk cartridge 1 will be described below.

Figure 5:
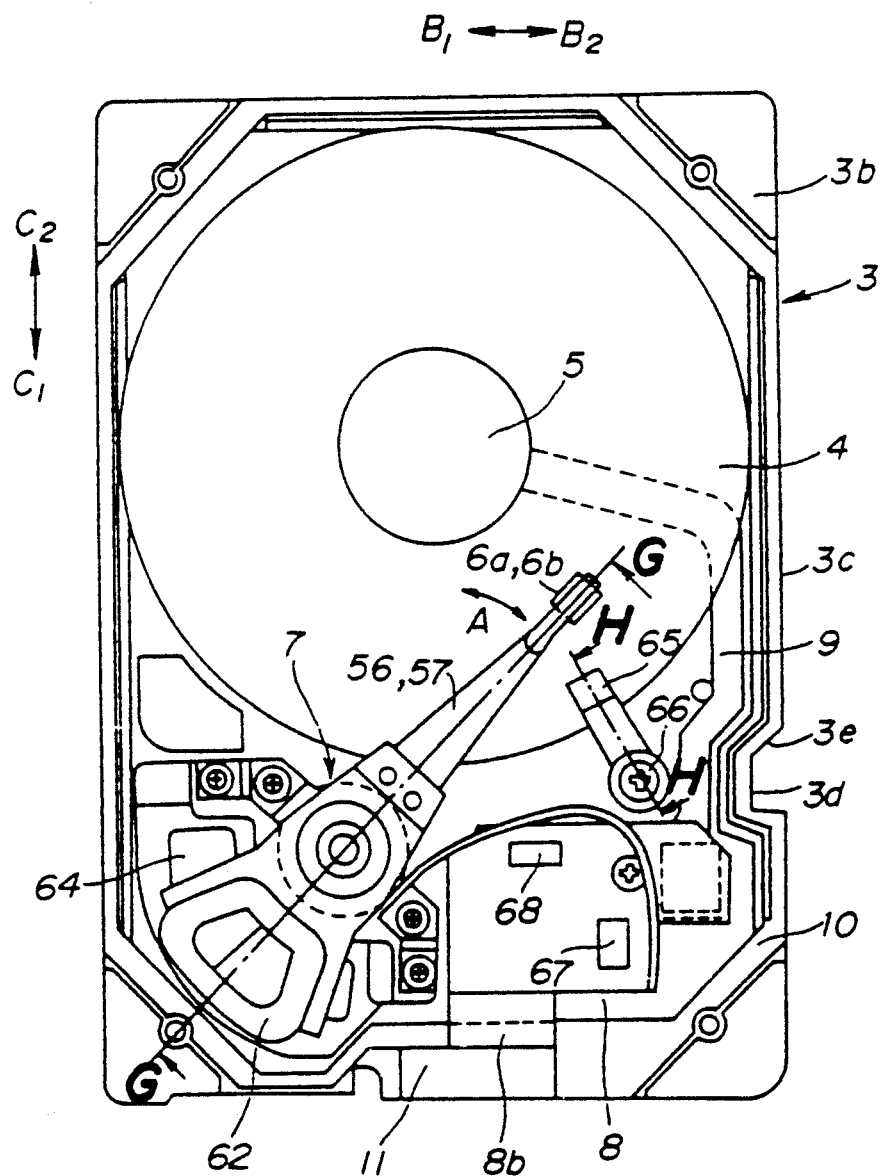
FIG. 5 is a plane view of the disk cartridge without an upper case.

Out of the various electrical mechanisms of the disk cartridge 1, the disk rotating mechanism will be described first with reference to FIG. 5 and FIG. 6(A). As shown in FIG. 5, the disk cartridge 1 comprises a magnetic disk 4, a spindle motor 5 to rotate the disk 4, magnetic heads 6a and 6b, a pair of head arms 56 and 57 with magnetic heads 6a and 6b at the tops thereon, and an actuator 7 for swinging the head arms 56 and 57. The disk rotating mechanism is a mechanism for rotating the disk 4, and comprises the spindle motor 5, a rotor (not shown), and a DC motor driving amplifier which is shown in FIG. 6(A). The disk 4 is fixed around the rotor of the motor 5 and both rotate together. The rotating speed of the motor 5 is determined by the amplifier 68, and controlled by a control circuit 33 which will be described later. Electric power is supplied to the motor 5 by the flexible printed circuit board 8 via a junction cord 9. The junction code 9 is pulled out via the side of the housing of the motor 5 and connected with the flexible printed circuit board 8.

Figure 6B:
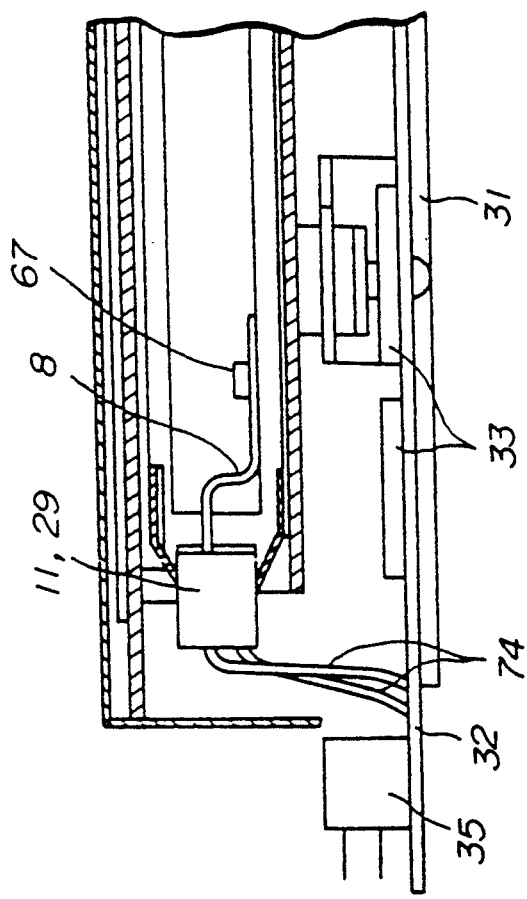
FIG. 6(B) is a cross-sectional view showing an electrical connection of connectors, a control circuit and an amplifier.
Figure 7:
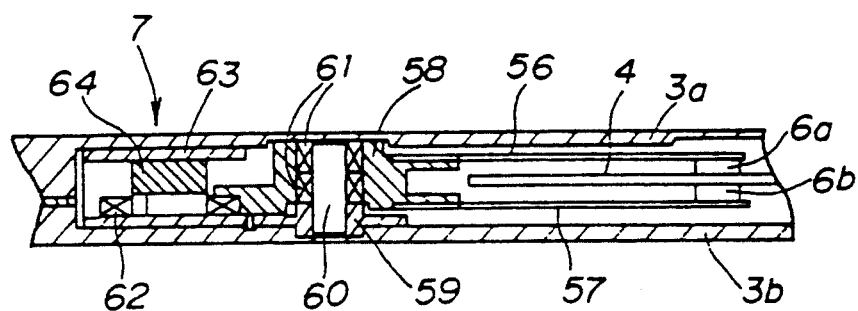
FIG. 7 is a cross-sectional view taken along line G—G in FIG. 5 showing an arrangement of the actuator and head arms.
Figure 8:
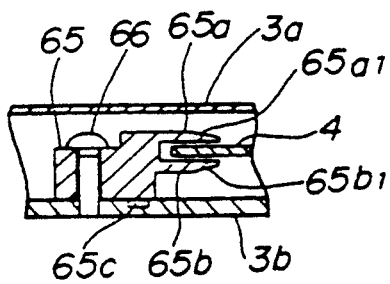
FIG. 8 is a cross-sectional view of a holding member taken along line H—H in FIG. 5.

Next, the head moving mechanism will be described below. The head moving mechanism is a mechanism for moving the heads 6a and 6b in an approximate radial direction of the disk 4, however, strictly speaking, it further includes a mechanism for moving the heads 6a and 6b from a recording position to a waiting position. The term "a recording position", as used herein, means a position of any one of the tracks on the disk 4. And the term "a waiting position", as used herein, means a position apart from the tracks on the disk 4. The head moving mechanism comprises magnetic heads 6a and 6b, head arms 56 and 57, an actuator 7 shown in FIG. 5, and an amplifier 67 shown in FIG. 6(A). AS shown in FIG. 5 and FIG. 6(A), the actuator 7 swings to the direction A, and moves the heads 6a and 6b in the approximate radial direction of the disk 4. The actuator 7 rotates by means of a supporting member 58 which will be described later. The actuator 7 and the heads 6a and 6b are electrically connected with the junction 8b via a wire 8a of the flexible printed circuit board 8. As shown in FIG. 7, the supporting member 58 is mounted pivotably around a rotation shaft 60 via bearings 61. The bearings 61 are engaged with the rotation shaft 60 which is mounted on a fixed plate 59. At the back of the supporting member 58, a driving coil 62 is located. The actuator 7 comprises the driving coil 62, a yoke 63, and a permanent magnet 64. The yoke 63 is fixed on the lower case 3b. The permanent magnet 64 is fixed under the yoke 63 and is located close and opposite to the driving coil 62. Therefore, when the driving coil 62 is energized, the supporting member 58 rotates and the heads 6a and 6b move approximately radially on the disk 4 on the basis of the Fleming's rule. Rotation of the actuator 7 is also controlled by the control circuit 33 shown in FIG. 6(A). After recording or reproducing, the head arms 56 and 57 rotate clockwise so as to be held by a holding member 65 of the holding mechanism. Because the disk cartridge 1 of the present invention is easily ejected and carried, it is easily subject to vibration. Accordingly, the heads are held not at the most inner track on the disk, but at the waiting position so that they do not bump the disk.

Figure 10:
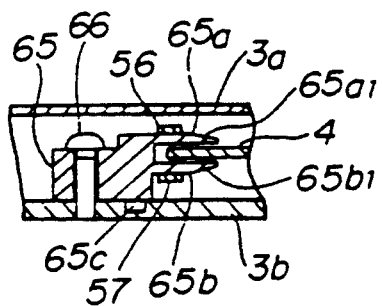
FIG. 10 is a cross-sectional view of the holding member taken along line I—I shown in FIG. 9.
Figure 9:
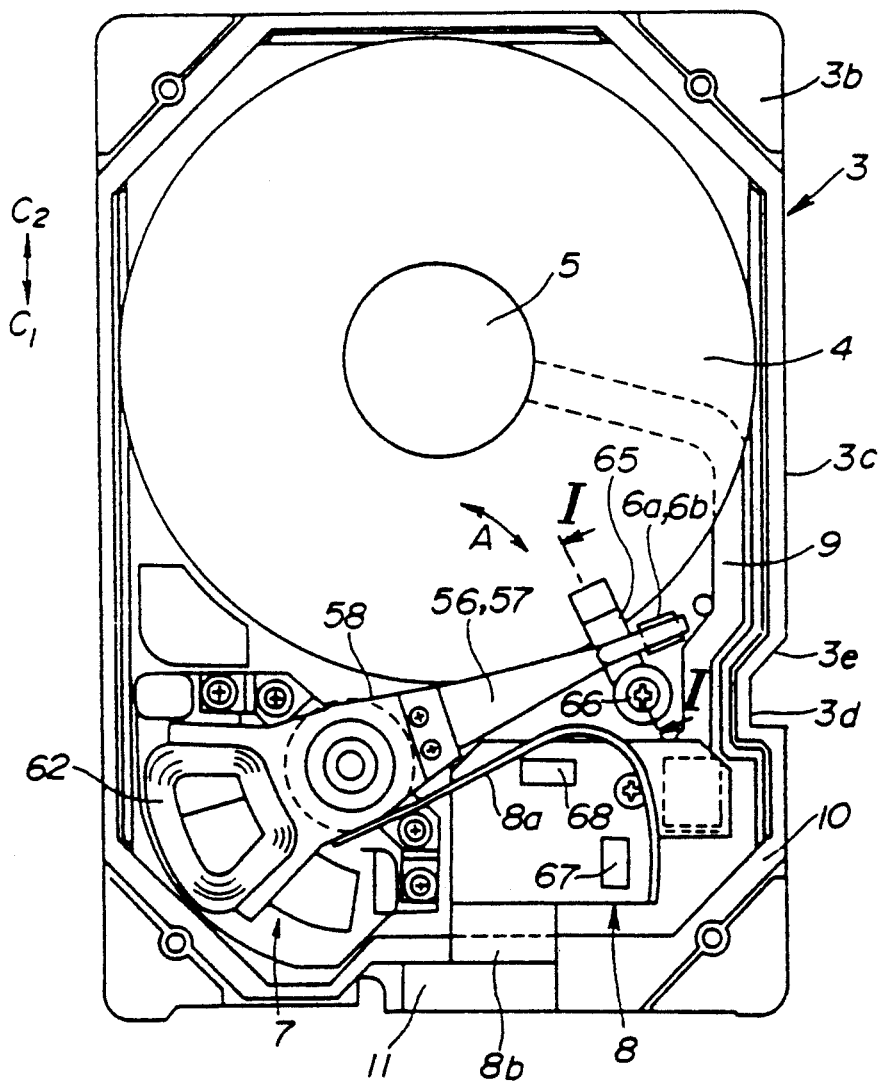
FIG. 9 is a plane view of the disk cartridge while the heads are held by the holding member.

The holding mechanism will now be described with reference to FIG. 5, FIG. 8, FIG. 9 and FIG. 10. The holding mechanism is a mechanism for holding the heads 6a and 6b at the waiting position. The holding mechanism comprises the holding member 65. The holding member 65 is fixed on the lower case 3b by a screw 66. When an electric power switch is turned off, the driving coil 62 is driven by reverse electromotive forces generated by the motor 5, and as a result, the head arms 56 and 57 rotate clockwise. The holding member 65 is located at the waiting position. The holding member 65 comprises a pair of holding plates 65a and 65b, a pair of inclined planes $65a_1$ and $65b_1$, and a protrusion 65c. The inclined planes $65a_1$ and $65b_1$ are respectively formed at the top of the holding plates 65a and 65b. The protrusion 65c is located at the bottom of the holding member 65 and is engaged with a pit of the lower case 3b to prevent the holding member 65 from rotating. The angles of the inclined planes $65a_1$ and $65b_1$ are almost equal to each other, and the holding plates 65a and 65b are parallel to the disk 4. When the head arms 56 and 57 touch the holding member 65, as shown in FIG. 9 and FIG. 10, they are lifted up on the holding planes 65a and 65b by way of the inclined planes 65$a_1$ and 65$b_1$. The holding plates 65a and 65b hold the head arms 56 and 57 by frictional forces. Therefore, the holding member 65 is made of dulalumin resin, for example. Thus the heads 6a and 6b are held at the waiting position, and never bump the disk 4 irrespective of vibrations so that carrying the disk cartridge 1 is convenient. When the heads 6a and 6b record or reproduce again, it is necessary to reset the heads 6a and 6b from the waiting position to the recording position by the resetting mechanism which will be described below.

The resetting mechanism will be described with reference to FIG. 6(A) through FIG. 6(C). The resetting mechanism is a mechanism for resetting the heads 6a and 6b smoothly from the waiting position to the recording position. As shown in FIG. 6(A), the resetting mechanism comprises the control circuit 33 of the driving device 2, the amplifier 67 for driving the actuator 7, and the DC motor driving amplifier 68. When the disk cartridge 1 is inserted into the driving device 2, the amplifiers 67 and 68 are connected with the control circuit 33 via connectors 11 and 29 respectively which will be described later. The control circuit 33 transmits access signals to the amplifiers 67 and 68, and controls the access of the positioning of the actuator 7 and rotational frequency of the motor 5 respectively. Thus the control circuit 33 controls positioning of the heads 6a and 6b, and the rotating speed of the disk 4. The access signals transmitted by the control circuit 33 may be generated by the driving device 2, or the above-mentioned host computer which is connected with the driving device 2.

The amplifiers 67 and 68 are electrically connected with the flexible printed circuit board 8, as shown in FIG. 5, FIG. 6(B) and FIG. 9. The amplifiers 67 and 68 may be formed like IC boards and be mounted on the flexible printed circuit board 8. On the other hand, the control circuit 33 is electrically connected, as shown in FIG. 6(B), with the connector 29 via a printed circuit board 32. Incidentally, the control circuit 33 may not be separated as shown in FIG. 6(B). The control circuit 33 may be formed like an IC board and be mounted on the printed circuit board 32. The connector 29 may be connected with the printed circuit board 32 via lead wires 74 shown in FIG. 6(B) or via a flexible printed circuit board. The amplifiers 67 and 68 are respectively connected with the driving coil 62 and the spindle motor 5. As described above, when the connector 11 is connected with the connector 29, the control circuit 33 is connected with the driving coil 62 and the spindle motor 5 via the amplifiers 67 and 68.

When the control circuit 33 receives a resetting command from, for example, the host computer, the control circuit 33 resets the heads 6a and 6b by means of the following resetting process.

Figure 6C:
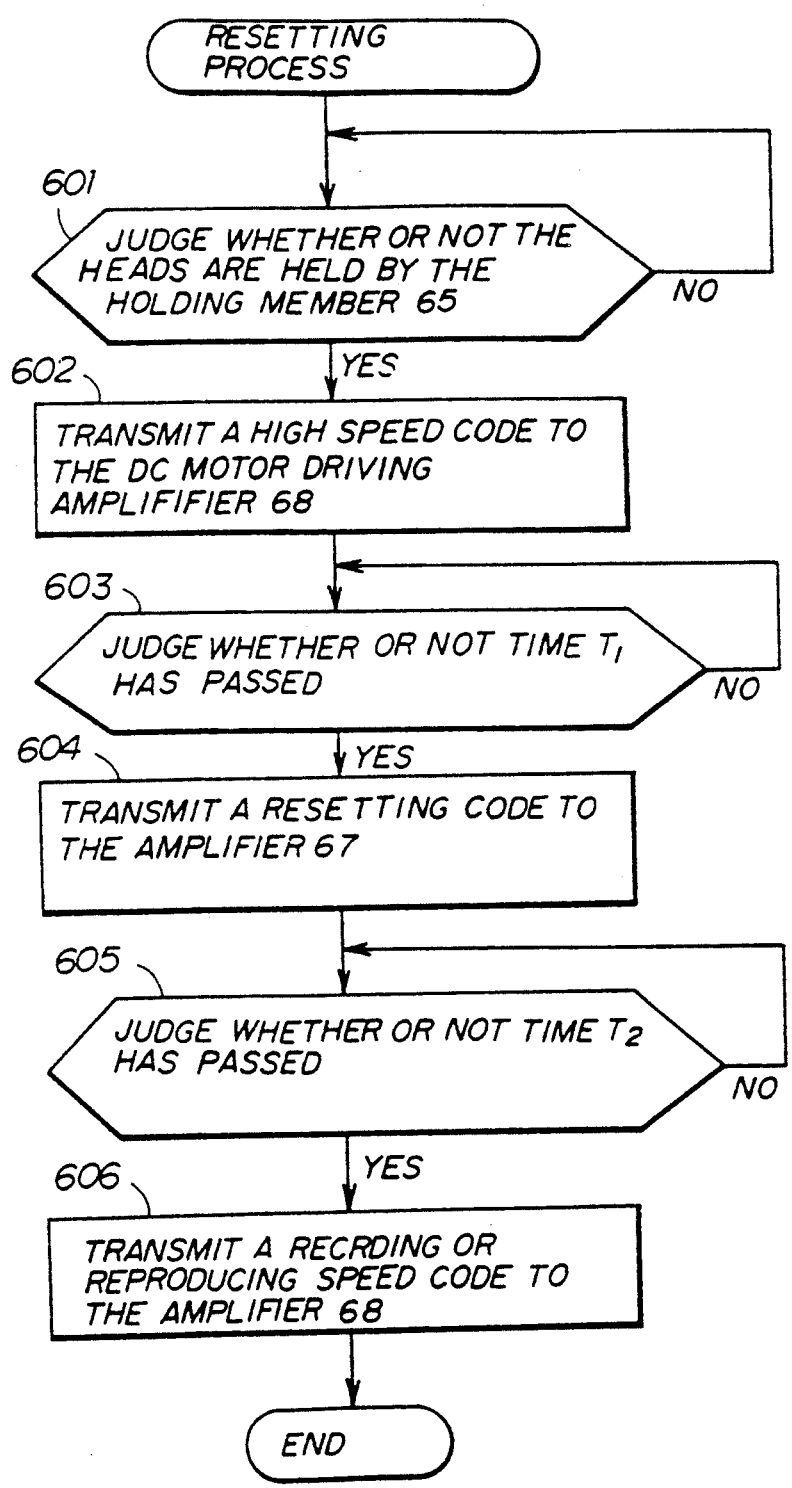
FIG. 6(C) is a flowchart for explaining operations of the control circuit.
Figure 6D:
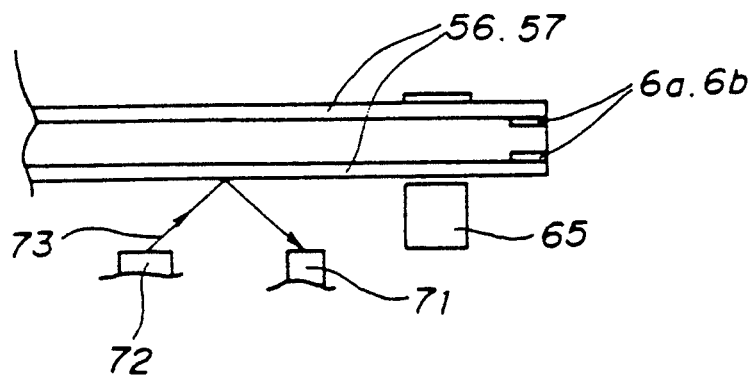
FIG. 6(D) is a side view showing a photosensor.

As shown in FIG. 6(C), first of all, a step 601 judges whether or not the heads 6a and 6b are held by the holding member 65. The step 601 can judge by means of, for example, an angle detecting sensor which detects the angle of the actuator 7 when the heads 6a and 6b are held by the holding member 65. Or the step 601 may judge by means of an angle detecting sensor which detects the engaging angle between the head arms 56 and 57 and the holding member 65 when the head arms 56 and 57 are held by the holding member 65. And the step 601 may judge by means of a photosensor 71, as shown in FIG. 6(D), which is located about the holding member 65 and senses a light from a light source 72 only when the head arms 56 and 57 are held by the holding member 65. Moreover, the step 601 may judge by means of a microswitch which is located about the holding member 65, and which turns on when the actuator 7 is held by the holding member 65 and turns off when the actuator 7 is separated from the holding member 65. If the heads 6a and 6b are not held, the process is fed back to the step 601 to prevent the heads 6a and 6b from malfunctioning. If the heads 6a and 6b are held by the holding member 65, a step 602 transmits an access signal showing a high speed code to the DC motor amplifier 68. The amplifier 68 energizes the driving coil 62 by means of the access signal, and rotates the motor 5 at a speed higher than that when recording or reproducing. In this embodiment, the amplifier 68 rotates the motor 5 at a speed 1.5 times higher than that when recording or reproducing (2400 rpm), that is 3600 rpm. Then a step 603 judges whether or not the mean TIME $T_1$ required for the rotating speed from 2400 rpm to 3600 rpm has passed. Unless it has passed, the process is fed back to the step 603. If the TIME $T_1$ has passed, a step 604 transmits a resetting code, by which the heads 6a and 6b are moved from the waiting position to the recording position, to the amplifier 67. Consequently, the head arms 56 and 57 held by the holding member 65 rotate counterclockwise. The head arms 56 and 57 are spaced from the holding member 65, and the heads 6a and 6b are moved to the recording position, respectively. This recording position may be a preselected track which is determined by the host computer, or it may be the track 0 for zero seeking. As the heads 6a and 6b are held by the holding member 65 by means of frictional forces, they tend to vibrate. However because of the high-speed rotating of the disk 4, an air current is created in the direction of rotation. Therefore, even if the head arms 56 and 57 are spaced from the holding member 65, the heads 6a and 6b float up from both sides of the disk 4, and never crash the disk 4 thanks to the air current. After the resetting code is transmitted, a step 604 judges whether or not mean TIME $T_2$ required for resetting has passed. Unless it passes, the process is fed back to the step 604. If the TIME $T_2$ has passed, a step 605 transmits an access signal showing a recording or reproducing speed code to the amplifier 68. The amplifier 68 rotates the motor 5 at a recording or reproducing speed, that is 2400 rpm, then the resetting mechanism process is over. Incidentally, the step 605 may detect the position of the actuator 7 by means of a photosensor which is located at the track 0 for zero seeking.

In this embodiment, it takes only several microseconds for the head arms 56 and 57 to move from the waiting position to the recording position, whereas it takes at least a couple of seconds for the motor 5 to convert the rotating speed from high speed to recording or reproducing speed. Therefore, in this embodiment, the TIME $T_1$ is 0, and the motor 5 is decelerated gradually the moment the head arms 56 and 57 are moved. The higher the rotating speed is, the more effective the function is, but when considering motor torque, bearing life, and vibrations, a speed of up to 5000 rpm is better. The resetting mechanism according to the present invention is even suitable in the case where the heads are held not at the waiting position but at the recording position. Therefore the resetting mechanism can be applied to conventional hard disk drives.

Figure 11:
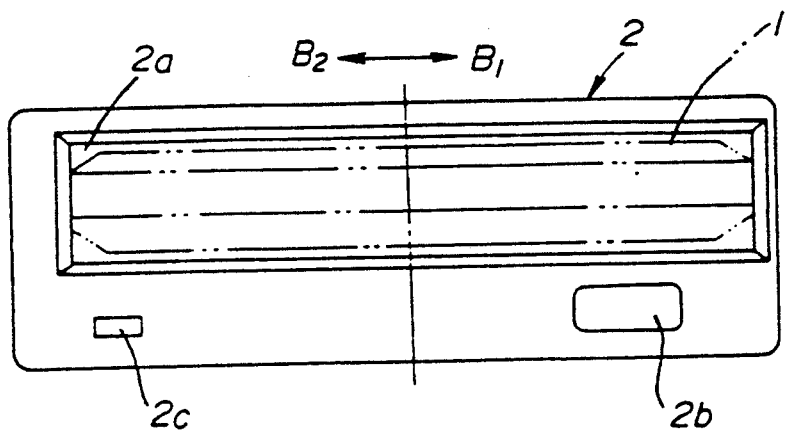
FIG. 11 is a front view of a driving device.

The following statement will describe the aforementioned mechanical mechanisms, such as the charging mechanism, the mis-insert preventing mechanism, the on-off shutter mechanism, the ejecting mechanism and the mis-eject preventing mechanism. The driving device 2 has, as shown in FIG. 1 and FIG. 11, the insert entrance 2a, an eject button 2b and an indicator 2c on a frontal panel 19. The indicator 2c indicates recording or reproducing of the disk cartridge 1.

Figure 13:
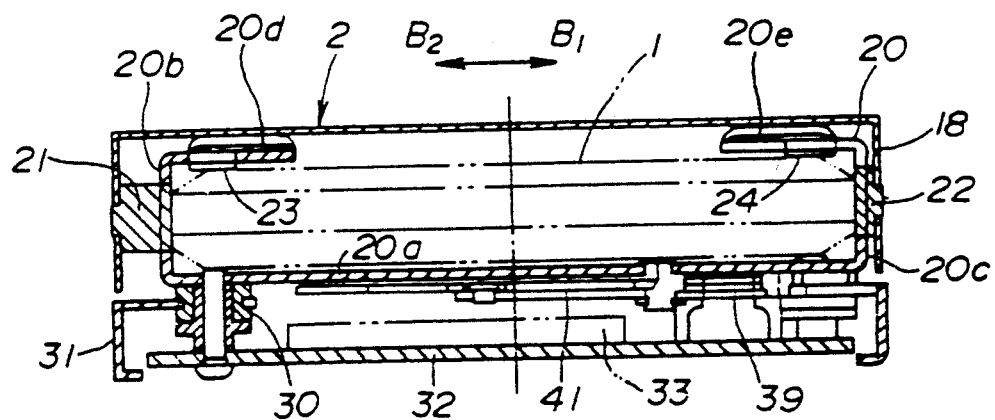
FIG. 13 is a cross-sectional view taken along line VIII—VIII shown in FIG. 12.
Figure 12:
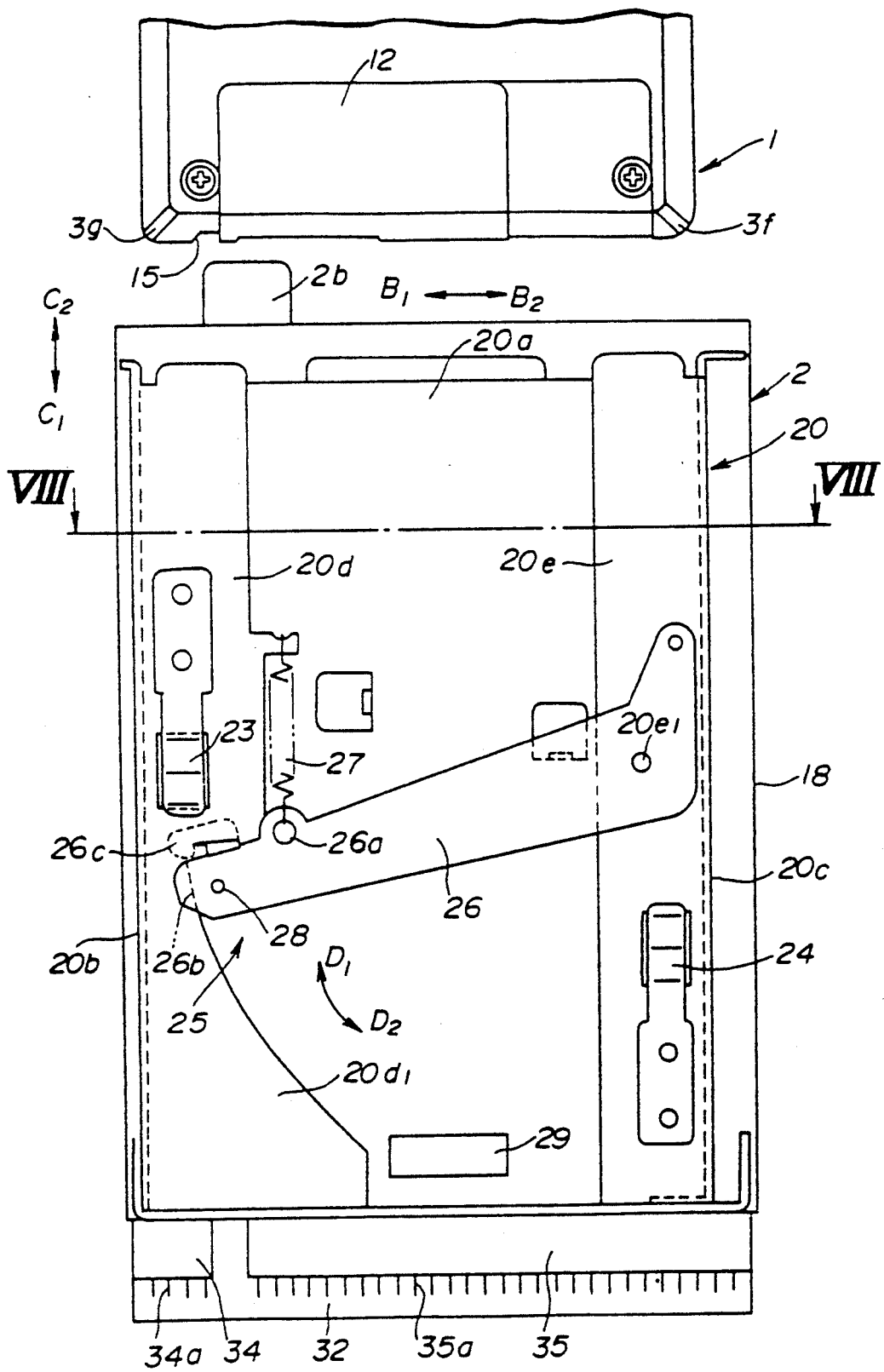
FIG. 12 is a plane view for explaining charging mechanism and on-off shutter mechanism.

First of all, the charging mechanism will be described below. The charging mechanism is a mechanism for charging the disk cartridge 1 which is inserted in the right direction via the insert entrance 2a, inside the driving device 2. The charging mechanism comprises a holder 20. As shown in FIG. 12 and FIG. 13, the holder 20 is located inside a housing 18 of the driving device 2. The holder 20 comprises a base plate 20a, side plates 20b and 20c and crown plates 20d and 20e. The side plates 20b and 20c are bent upward from the base plate 20a. The crown plates 20d and 20e are bent respectively from the side plates 20b and 20c and are parallel and opposite to the base plate 20a. As shown in FIG. 13, both side plates 20b and 20c are fixed on the housing via supporting members 21 and 22. And the base plate 20a is fixed on the base 32 with a chassis 31 via a vibration absorbing member 30. The crown plates 20d and 20e respectively have flat springs 23 and 24 which compress and hold the disk cartridge 1 while it is inserted. Thus, if the disk cartridge 1 is inserted in the right direction, it is held by the flat springs 23 and 24, and fixed inside the driving device 2. A connector 29 of the driving device 2 is connected with a connector 11 of the disk cartridge 1, and electric power is supplied by the driving device 2 to the disk cartridge 1 via the connectors 29 and 11. If an attempt is made to insert the disk cartridge 1 in the wrong direction, it is prevented from being inserted by the mis-insert preventing mechanism. The shutter 12 which encloses the connector 11 is opened or closed by the on-off shutter mechanism.

Figure 15:
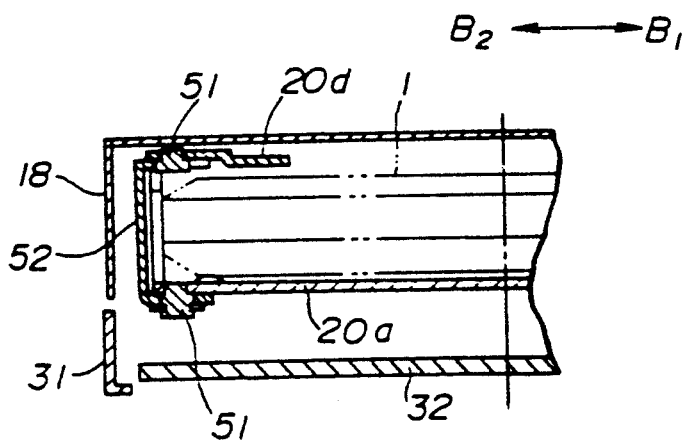
FIG. 15 is a front view taken along line X—X shown in FIG. 14.
Figure 14:
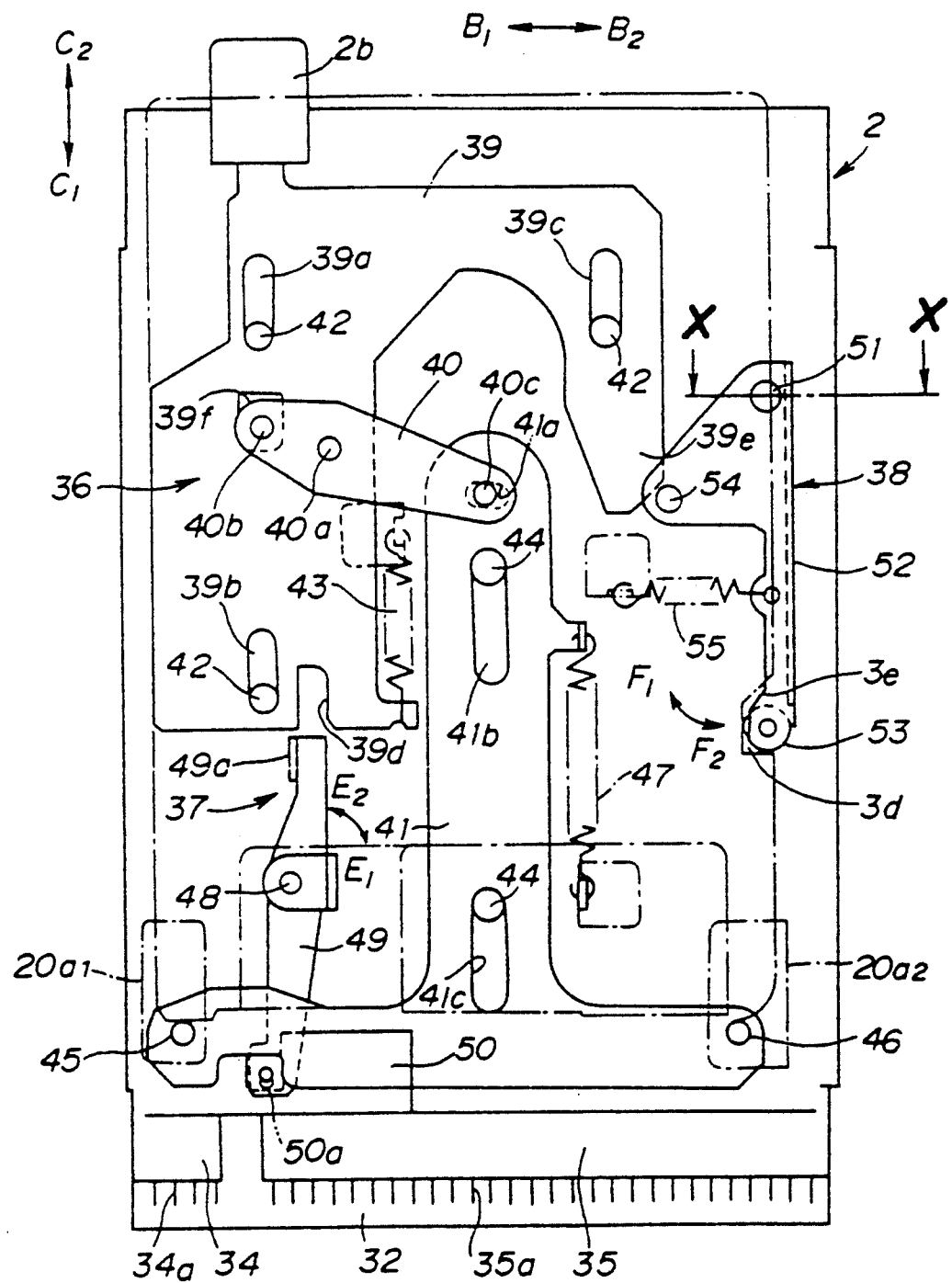
FIG. 14 is a plane view for explaining each mechanism in the driving device.
Figure 16:
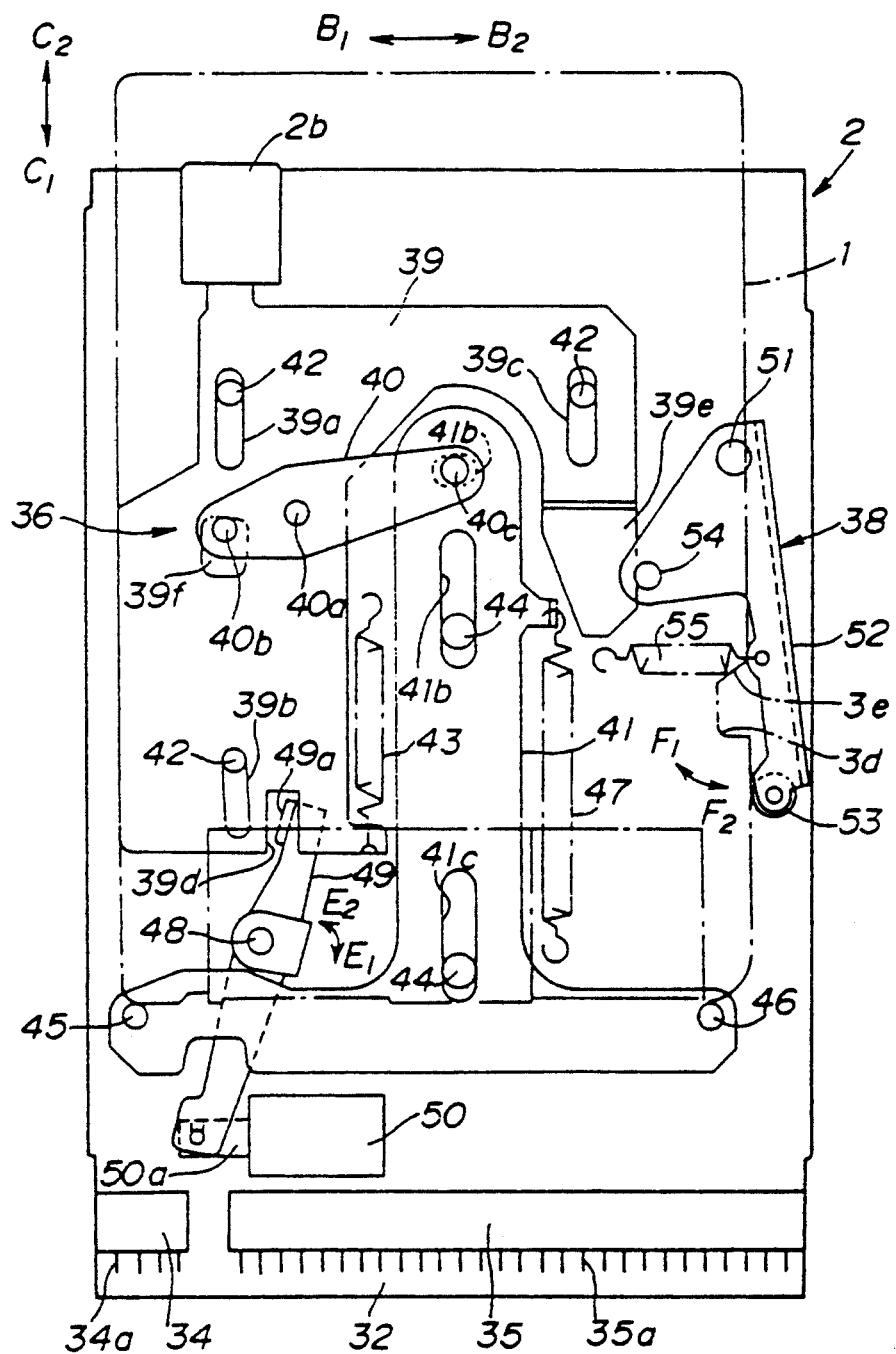
FIG. 16 is a plane view for explaining the ejecting operation.

The mis-insert preventing mechanism 38 is a mechanism for allowing the disk cartridge 1 to be inserted with only the right direction. A description will be given of the mis-insert preventing mechanism with reference to FIG. 2 (A), FIG. 14 through FIG. 17. The mis-insert preventing mechanism comprises a lock lever 52, a roller 53, and a pin 54 which are located in the driving device 2, and a lock-groove 3d and the corners 3f through 3i which are located on the disk cartridge 1. The lock-groove 3d is formed on the case 3 at the right side 3c shown in FIG. 2(A). The lock-groove 3d has an inclined plane 3e which is inclined to the eject direction ($C_2$ direction). The corner 3f is chamferred with a smaller radius than other corners 3g through 3i. The lock lever is mounted on the side plate 20c pivotably around shafts 51. The roller 53 is located at the end of the locking lever 52. The pin 54 is slidably touched to the pushing portion 39e of the eject lever 39. The lock lever 52 is forced pivotably to a direction $F_1$ by the tensile force of the coil spring 55 which is engaged with the base plate 20a at its end thereof. When the disk cartridge 1 is inserted in the right direction, the corner 3f pushes out the roller 53 to the direction $F_2$. When the disk cartridge 1 is inserted completely, the lock lever 52 pivots to the direction $F_1$ by the spring 55, and the roller 53 is engaged with the lock-groove 3d to fix the disk cartridge 1 in the holder 20. Because of the inclined plane 3e, the roller 53 is easily engaged with the lock-groove 3d. Thus, the disk cartridge 1 is fixed at the predetermined position, and is connected with the driving device 2 electrically. As shown in FIG. 15 and FIG. 17, the shafts 51 are located opposite to each other. When the disk cartridge 1 is ejected, as shown in FIG. 14 and FIG. 16, the eject button 2b is pushed, and the pushing portion 39e of the eject lever 39 pushes the pin 54. Then the lock lever 52 is pivoted to the direction $F_2$ so that the roller 53 sets free the disk cartridge 1. When the disk cartridge 1 is inserted in the wrong direction, in other words, when one of the corners 3g through 3i touches the roller 53, the roller 53 cannot be pushed out to the direction $F_2$ because of its being smaller chamferred than the corner 3f. Therefore the disk cartridge 1 is prevented from being mis-inserted at the vicinity of the roller 53. Since the roller 53 also fixes the disk cartridge 1 inside the driving device 2, it may be considered as a part of the ejecting mechanism.

The on-off shutter mechanism is a mechanism for opening the shutter 12, which is usually closed for protecting the connector 11 from dust, only when the connector 11 is connected with the connector 29.

Figure 3A:
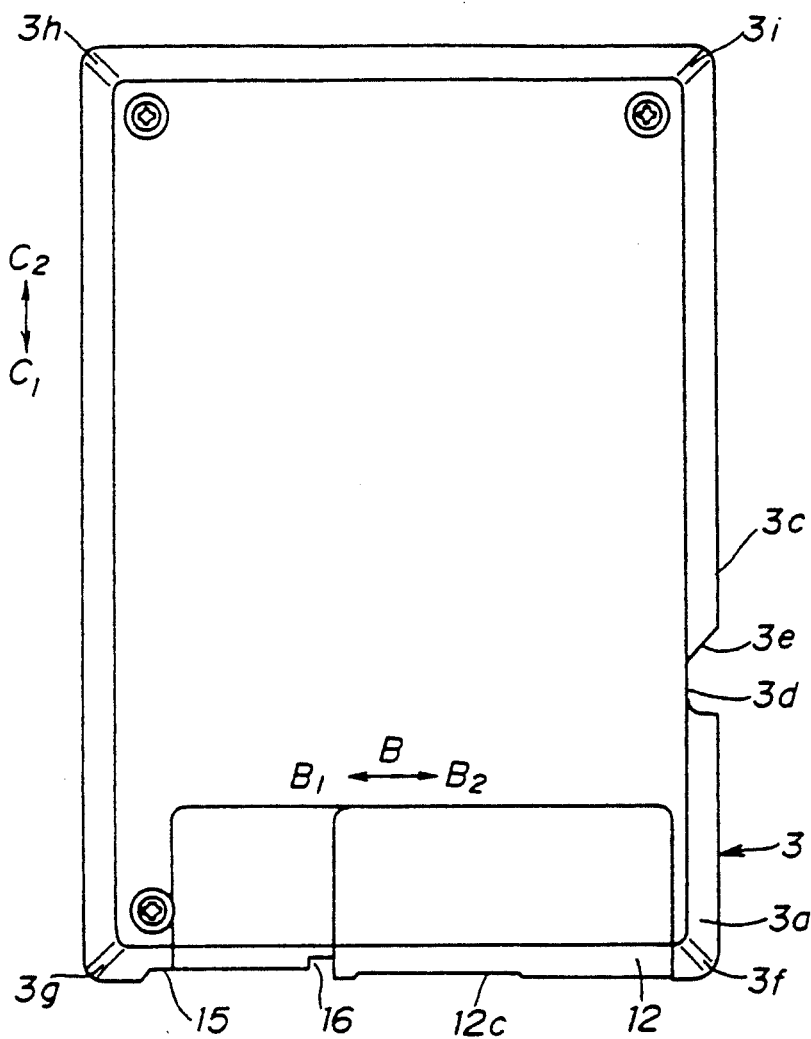
FIG. 3(A) and FIG. 3(B) are respectively a plane view and a front view of the disk cartridge while a shutter is opened.
Figure 3B:
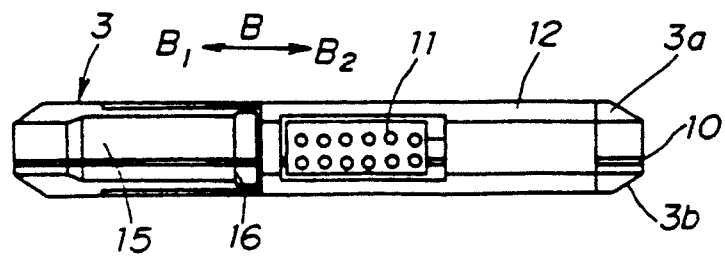
Figure 4C:
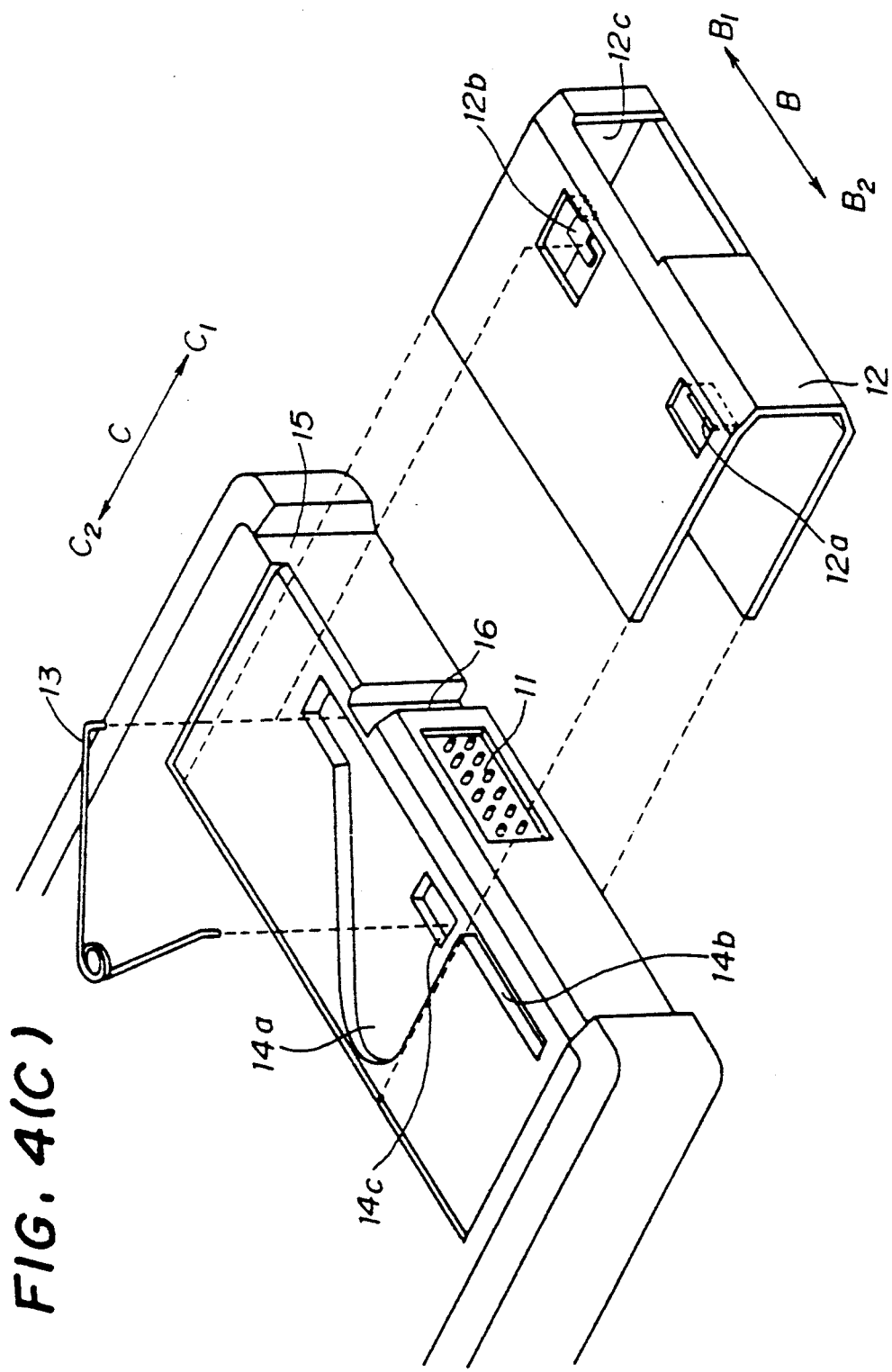

Before explaining the on-off shutter mechanism 25, operation of the shutter 12 of the disk cartridge 1 will be described below. Referring to FIG. 4(A), FIG. 4(B) and FIG. 4(C), the connector 11 is enclosed and protected from dust by the shutter 12. The shutter 12 can be slid in a direction B along the side of the case 3. The shutter is slid by mechanism of engagement between two tabs 12a of the shutter 12 and a groove 14. As shown in FIG. 4(C), the groove 14 is located under the lower case 3b about the connector 11. The groove 14 comprises a spring chamber 14a, a guide portion 14b and a concave portion 14c. A torsion spring 13 is accommodated in the spring chamber 14a. And the guide portion 14b guides the tabs 12a in the direction B. The two tabs 12a are coupled with the shutter 12, and both engage with the groove 14. One end of the spring 13 is engaged with a hook 12b, and the other end is engaged with a concave portion 14c. Therefore the shutter 12 is forced by the spring 13 in the direction $B_1$ when the shutter 12 is slid in the direction $B_2$. Note from FIG. 3(B) that since the shutter 12 further moves by an idle distance * so as to connect the connector 11 to the connector 29 in the driving device 2. The force of the spring 13 in the direction $B_1$ is not zero even when the shutter 12 is not slid so that the shutter 12 can always protect the connector 11 from dust.

Figure 18:
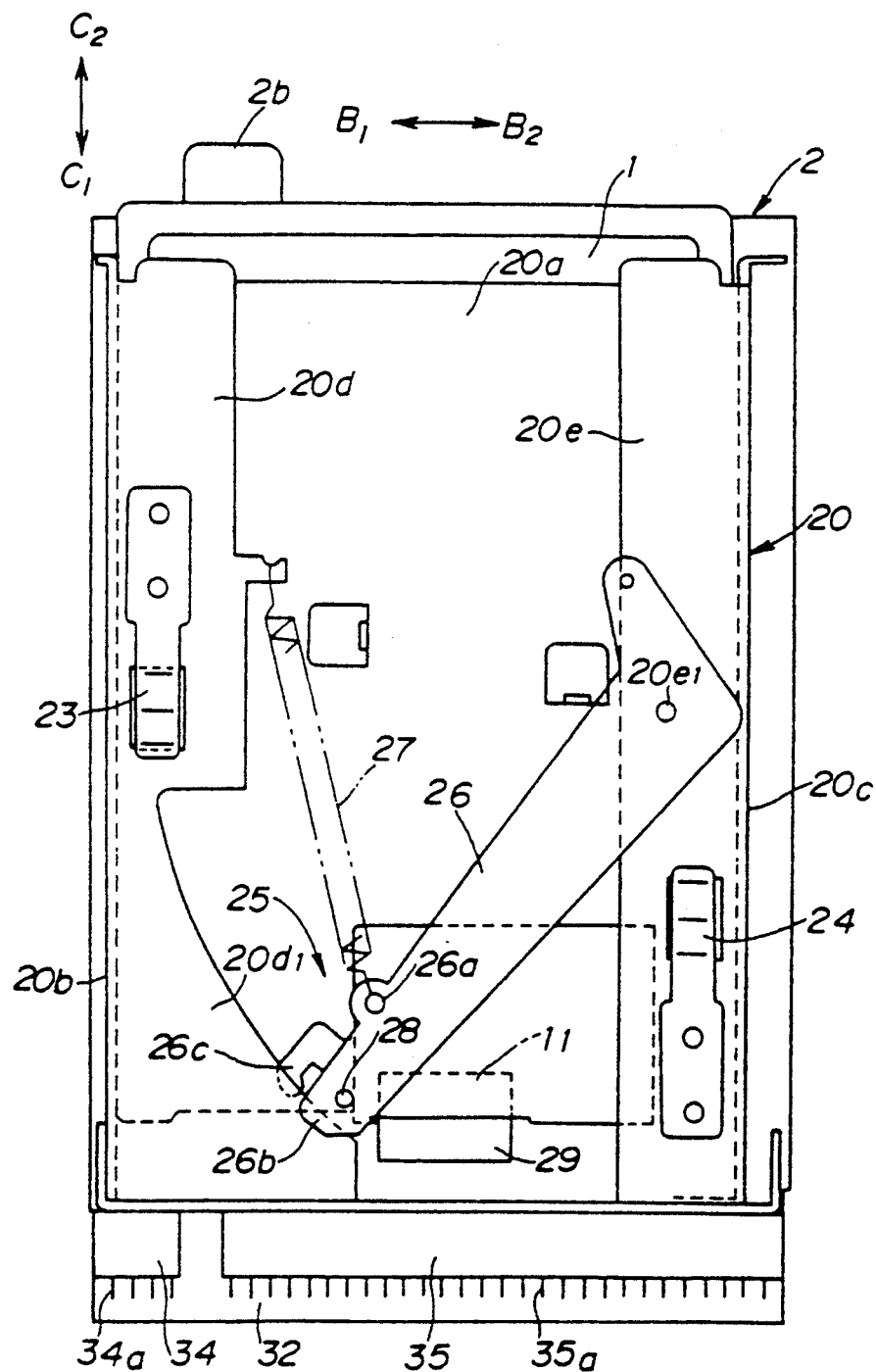
FIG. 18 is a cross-sectional view for explaining the on-off shutter mechanism.

*after the connector 11 is exposed, the disk cartridge 1 can be moved by a distance corresponding to the idle distance Next, the on-off shutter mechanism 25 will be described in detailed with reference to FIG. 12, FIG. 18 and FIG. 19. The on-off shutter mechanism 25 comprises a pivot lever 26, a coil spring 27 and a pin 28. The pivot lever 26 is mounted pivotally around an axis $20e_1$ on the crown plate 20e. The coil spring 27 is engaged with a hole 26a in the pivot lever 26 at one end thereof, and is engaged with the crown plate 20d at the other end thereof. Therefore the pivot lever 26 is forced by the spring 27 in the direction $D_1$. The pin 28 projects into the holder 20 at the top of the pivot lever 26. When the disk cartridge 1 is inserted, the pin 28 is inserted into an indentation 15 of the disk cartridge 1, and is engaged with one end of the shutter 12. As the disk cartridge 1 is inserted, the pivot lever 26 pivots around the axis $20e_1$, and slides along a arc $20d_1$. A hook 26c which extends from a top end 26b of the pivot lever 26 holds the crown plate 20d with the top end 26b so that the pivot lever 26 can always slide along the arc $20d_1$. The pin 28 slides the shutter 12 in the direction $B_2$ as the pivot lever 26 pivots. When a cutout portion 12c of the shutter 12 comes to a position corresponding to the connector 11, the pin 28 is engaged with a slot 16 which is formed on the indentation 15 so that the shutter 12 is locked at an opening position. Thus the connector 11 can be connected with the connector 29 of the driving device 2. The connector 29 is located on the base plate 20a, and the driving device is connected with a computer via connectors 34 and 35 with multiple connector pins. The term "an opening position", as used herein, means a position where the connector 11 is laid bare. On the other hand, when the disk cartridge 1 is ejected, the shutter 12 is always locked at a closing position to protect the connector 11. Thus even when the disk cartridge 1 is ejected and carried, the case 3 is kept airtight. The term "a closing position", as used herein, means a position where the connector 11 is enclosed by the shutter 12.

In this embodiment, driving current supplied to the driving coil 62, the information recorded and/or reproduced by the heads 6a and 6b, and access signals for controlling the driving of the heads 6a and 6b and the motor 5 are transmitted between the disk cartridge 1 and the driving device 2 via the connectors 11 and 29. However, the connectors 11 and 29 may be divided into a plural number of connectors, such as a current supplying connector, an information input/output connector, and a signal input/output connector.

Moreover, in this embodiment, the disk cartridge is inserted into the driving device 2, however, the connector 29 may have a shutter thereon in a magnetic disk drive shown in FIG. 1(B) where the driving device 2 is inserted into the disk cartridge 1.

The ejecting mechanism is a mechanism for ejecting the disk cartridge 1 which is inserted into the driving device 2. The eject mechanism 36 will be described with reference to FIG. 14, FIG. 16 and FIG. 19. As shown in FIG. 14, the eject mechanism 36 comprises the eject lever 39, a link 40 and a slider 41.

The eject lever 39 has slits 39a through 39c, and pins 42 which are mounted on the base plate 20a engaged with them. Therefore the eject lever 39 can be slid in the direction C. FIG. 19 shows the configuration between the base plate 20a and the eject lever 39. The eject lever is engaged with one end of a coil spring 43, the other end of which is engaged with the base plate 20a. Because the coil spring 43 is located in the direction $C_2$, the eject lever 39 is forced by the spring 43 in the direction $C_2$. The eject button 2b is attached at the top of the eject lever 39. The eject lever 39 has a gain 39d which is engaged with the mis-eject prevent mechanism described later, and the pushing portion 39e which is engaged with the mis-insert prevent mechanism 38 described above.

The link 40 is mounted pivotably around a shaft 40a which is supported between the eject lever 39 and the base plate 20a. The link 40 has pins 40b and 40c at the ends thereof respectively. The pin 40b is engaged with a hold 39f of the eject lever 39, and the pin 40c is engaged with a hole 41a of the slider 41.

The slider 41 is formed as a T-shape in the direction $C_1$. The slider 41 has slits 41b and 41c in the direction $C_1$. The slits 41b and 41c are engaged with pins 44 mounted on the base plate 20a. Therefore the slider 41 can be slid in the direction C. The slider 41 has eject pins 45 and 46 at the right and left ends of the T-shape thereof. The eject pins 45 and 46 are engaged with the end of the disk cartridge 1. The eject pins 45 and 46 project into the holder 20 through the entrances $20a_1$ and $20a_2$ of the base plate 20a. The slider 41 is engaged with one end of a coil spring 47, the other end of which is engaged with the base plate 20a. The coil spring 47 is located in the direction $C_1$, and the slider 41 is forced by the spring 47 in the direction $C_1$.

When the eject button 2b is pushed, as shown in FIG. 16, the eject lever 39 is moved in the direction $C_1$, and the pin 40b is forced in the direction $C_1$. As a result, the link 40 pivots counterclockwise around the shaft 40a on the basis of the principles of the lever, and the pin 40c is forced in the direction $C_2$. Thus, the pin 40c moves the slider 41 in the direction $C_2$, and as shown in FIG. 19, the eject pins 45 and 46 push the end of the disk cartridge 1 to eject. After ejecting, the eject lever 39 and the slider 41 is reset at the predetermined position respectively by means of tensile forces of springs 43 and 47.

Figure 20A:
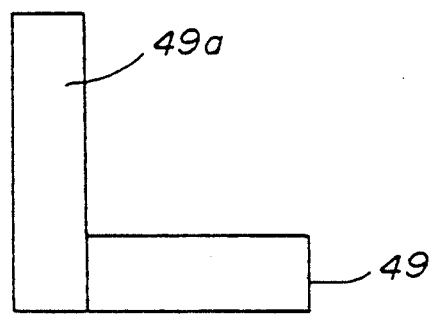
FIG. 20(A) and FIG. 20(B) are respectively a front view and a side view for explaining a projection.
Figure 20B:
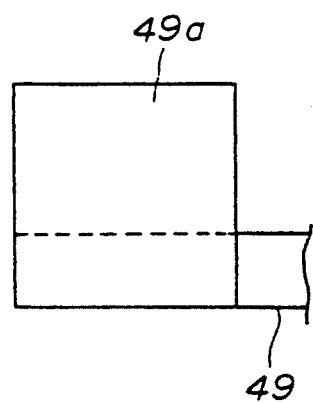

Lastly, the mis-eject prevent mechanism will be described below with reference to FIG. 14, FIG. 16 and FIG. 20. The mis-eject prevent mechanism is a mechanism for preventing the disk cartridge 1 from being ejected during recording or reproducing. The mis-eject prevent mechanism 37 comprises a lever 49 and a solenoid 50 which pivots the lever 49. The lever 49 is mounted pivotably around a shaft 48 which is supported on the base plate 20a. The lever 49 has a projection 49a at one end thereof, and is engaged with a plunger 50a of the solenoid 50 at the other end thereof. The projection extends upward so that the eject lever 39 can be moved in the direction $C_1$ and the disk cartridge 1 can be ejected only when the projection is engaged with the gain 39d of the eject lever 39. The projection 49a is formed like a rectangular plate as shown in FIG. 20(A) and FIG. 20(B), however it may be formed as other figures as long as it touches the ejecting lever when it is not engaged with the gain 39d. The solenoid 50 is magnetized while the heads 6a and 6b are located on tracks on the disk 4, and is erased magnetically while the heads 6a and 6b are located at the waiting position. Therefore while the heads 6a and 6b record or reproduce, the solenoid 50 is magnetized, and the lever 49 is pivoted in the direction $E_2$. Consequently the eject lever 39 touches the projection 49a and the disk cartridge 1 cannot be ejected. However when recording or reproducing is over, the heads 6a and 6b are moved to the waiting position, so the solenoid 50 is erased magnetically. Consequently, as shown in FIG. 16, the lever 49 is pivoted in the direction $E_2$, and the projection 49a is engaged with the gain 39d to allow the disk cartridge 1 to be ejected.

Further, the present invention is not limited to these preferred embodiments, but various variations and modifications may be made without departing from the scope of the present invention.

What is claimed is:

1. A magnetic disk drive comprising:
   a disk cartridge including a magnetic disk; and
   a driving device engageable with said disk cartridge, wherein said driving device comprises:
   a disk rotating means, coupled to said magnetic disk, for rotating said magnetic disk,
   a magnetic head which records information on said magnetic disk and/or reproduces information therefrom, a housing which encloses said magnetic disk, disk rotating means, and magnetic head, so as to keep these components in an airtight environment, a first connector, coupled to said disk rotating means and said magnetic head, which receives electricity, said information, and control signals, said electricity being used to drive said magnetic disk and said magnetic head, and said control signals being used to control operations of said magnetic disk and/or said magnetic head so that said magnetic head can properly record said information on said magnetic disk and/or reproduce said information therefrom, said first connector being embedded in said housing so that even if said first connector is uncovered, an interior of said housing can be kept in an airtight environment;

a connector cover movable between a first position and a second position, said connector cover completely covering said first connector at said first position, said connector cover completely uncovering said first connector at said second position;

wherein said driving device further comprises:

a second connector, connectable to said first connector, which supplies said electricity, said information to be recorded by said magnetic head, and said control signals, to said first connector of said disk cartridge, and which receives said information reproduced by said magnetic head;

cover moving means, coupled to said connector cover, for moving said connector cover between said first position and said second position, said cover moving means moving said connector cover to said second position when said first connector is to be connected to said second connector, and said cover moving means moving said connector cover to said first position when said first connector is disconnected from said second connector, wherein said disk cartridge has a substantially rectangular parallelepiped shape defined by first, second and third lengths, which shape includes a first surface defined by said first and second lengths and a second surface defined by said second and third lengths, said first connector being embedded in said first surface, and said second surface including a groove extending along a direction of said second length, wherein said connector cover comprises:

a tab engaged with said groove so that said connector cover can be moved along said groove via said tab; and an elastic member having two ends, located in said groove, one end of which is engaged with said tab, and the other end of which is engaged with said groove, so that said connector cover is forced toward said first position by said electric member, said disk cartridge adapted to be inserted into said driving device so as to be engaged therewith, within said cover moving means comprises a pin, engageable with an end of said connector cover, which is engaged with the end of said connector cover when insertion of said disk cartridge into said driving device is started, and which gradually moves said connector cover from said first position to said second position against a force of said elastic member as said disk cartridge is being gradually inserted into said driving device.

* * * * *